(12) United States Patent
Ao et al.

(10) Patent No.: US 8,985,470 B2
(45) Date of Patent: Mar. 24, 2015

(54) CODE PATTERN HAVING CROSS-SHAPED POSITIONING PATTERN AND IMAGE PROCESSING DEVICE FOR PROCESSING THE SAME

(75) Inventors: Chen-Hua Ao, Hsin-Chu (TW); Yi-Hsin Tao, Hsin-Chu (TW)

(73) Assignee: Elan Microelectronics Corp., Hsin-Chu (TW)

( * ) Notice: Subject to any disclaimer, the term of this patent is extended or adjusted under 35 U.S.C. 154(b) by 1106 days.

(21) Appl. No.: 12/268,672

(22) Filed: Nov. 11, 2008

(65) Prior Publication Data

US 2010/0078478 A1 Apr. 1, 2010

(30) Foreign Application Priority Data

Sep. 26, 2008 (TW) .............................. 97137050 A

(51) Int. Cl.
*G06K 7/14* (2006.01)
*G06K 19/06* (2006.01)
(52) U.S. Cl.
CPC ........ *G06K 19/06037* (2013.01); *G06K 7/1443* (2013.01)
USPC ....................................................... 235/494
(58) Field of Classification Search
USPC .................... 235/462.1, 462.11, 487, 494
See application file for complete search history.

(56) References Cited

U.S. PATENT DOCUMENTS

| | | | | |
|---|---|---|---|---|
| 5,189,292 | A | * | 2/1993 | Batterman et al. ............ 235/494 |
| 5,773,806 | A | * | 6/1998 | Longacre, Jr. ............. 235/462.1 |
| 5,860,679 | A | * | 1/1999 | Fukuda et al. ................. 283/70 |
| 6,267,296 | B1 | * | 7/2001 | Ooshima et al. ............. 235/487 |
| 2004/0182930 | A1 | * | 9/2004 | Nojiri ...................... 235/462.04 |
| 2007/0187508 | A1 | * | 8/2007 | Takayama ............... 235/462.01 |

OTHER PUBLICATIONS

Weisstein, Eric W. "Geometric Centroid." From MathWorld—A Wolfram Web Resource. http://mathworld.wolfram.com/Geometric-Centroid.html.*

* cited by examiner

*Primary Examiner* — Christopher Stanford
(74) *Attorney, Agent, or Firm* — Muncy, Geissler, Olds & Lowe, P.C.

(57) ABSTRACT

A code pattern having cross-shaped positioning patterns is disclosed, comprising: a plurality of marks, which at least include a central positioning mark, a first positioning mark, a second positioning mark, a third positioning mark, and a fourth positioning mark; the central and the first to fourth positioning marks are distributed in a region along with other marks. The first to fourth positioning marks are four neighboring marks that are closest to the central positioning mark in distance. In addition, The central and the first to fourth positioning marks are disposed in the shape of a cross within the region, and corresponding to a coordinate obtained by adding together four coordinates from the first to fourth positioning marks then dividing a resulted sum thereof by four, is equivalent to a coordinate corresponding to the central positioning mark.

8 Claims, 6 Drawing Sheets

CODE PATTERN HAVING CROSS-SHAPED POSITIONING PATTERN AND IMAGE PROCESSING DEVICE FOR PROCESSING THE SAME

FIELD OF THE INVENTION

The invention relates to a code pattern and code patterns, and more particularly to a code pattern and code patterns having cross-shaped positioning patterns.

BACKGROUND OF THE INVENTION

The prior arts related to a code pattern and code patterns have been disclosed in Japan Patent Publication No. 2007-11890, U.S. Patent Publication No. US2007/026547, Taiwan Utility Model Patent Application No. 094205159, U.S. Patent Publication No. US2003/011164, and U.S. Patent Publication No. US2006/0007255.

Conventionally, when positioning marks of a code pattern are affected by the tilting or rotating of images, it often results in difficulty in identifying the positioning marks. This is when the process of image alignment is used for aligning the tilted or rotated images, which facilitates the identification of the positioning marks. However, the calculation and processing of the image alignment process is so time-consuming that it cannot be completed without the use of hardware with high computational capability.

In light of the disadvantages of prior code pattern and positioning marks, the inventor of the present invention has proposed a code pattern having a cross-shaped positioning pattern, such that five positioning marks may be readily differentiated from numerous other marks, and the cross-shaped positioning patterns of the code pattern will not become difficult to identify when images are tilted or rotated.

SUMMARY OF THE INVENTION

A primary objective of the invention is to provide a code pattern and code patterns having cross-shaped positioning patterns, which facilitates the differentiation of positioning marks from numerous other marks.

A further objective of the invention is to provide a method for interpreting a code pattern, which allows for quickly finding a positioning pattern in a code pattern, such that information represented by the code pattern may be interpreted.

BRIEF DESCRIPTION OF DRAWINGS

The structure, the features, and the performance of the present invention can be more clearly understood by referring to the following detailed description of the preferred embodiments and the accompanying diagrams, wherein.

DETAILED DESCRIPTION OF THE INVENTION

Figure 1:
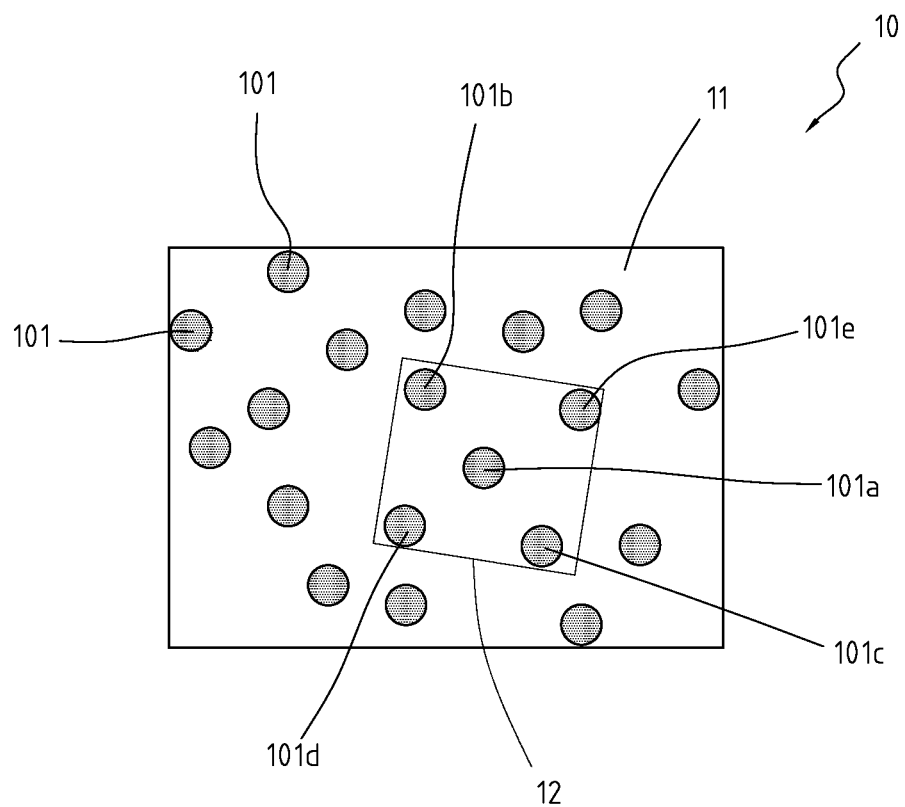
FIG. 1 is a view that shows distribution of marks in a code pattern having a cross-shaped positioning pattern according to the invention.

Referring to FIG. 1 of the invention, a code pattern 10 is a code pattern having a cross-shaped positioning pattern 12, and the code pattern 10 comprises plurality of marks 101 and a cross-shaped positioning pattern 12, in which the cross-shaped positioning pattern 12 comprises five marks 101a, 101b, 101c, 101d, and 101e from the plurality of marks 101. The marks 101 and the cross-shaped positioning pattern 12 are distributed within a region 11. The cross-shaped positioning pattern 12 can be readily identified, hence it is possible to easily differentiate the five marks 101a, 101b, 101c, 101d, and 101e from the many marks 101. The cross-shaped positioning pattern 12 provides a function of positioning; therefore, the other marks 101 can be identified by relying on a correlative relationship between the other marks 101 and the cross-shaped positioning pattern 12. For example, the correlative relationship between the other marks 101 and the cross-shaped positioning pattern 12 in regard to both distance and direction can be used to identify the other marks 101.

The code pattern 10 of the invention comprises: a plurality of marks 101, wherein the marks 101 at least include a central positioning mark 101a, a first positioning mark 101b, a second positioning mark 101c, a third positioning mark 101d, and a fourth positioning mark 101e. The central positioning mark 101a, the first positioning mark 101b, the second positioning mark 101c, the third positioning mark 101d, and the fourth positioning mark 101e are distributed within the region 11 along with the other marks 101. The cross-shaped positioning pattern 12 of the code pattern 10 comprises the central positioning mark 101a, the first positioning mark 101b, the second positioning mark 101c, the third positioning mark 101d, and the fourth positioning mark 101e, and is disposed in a shape of a cross. The first positioning mark 101b, the second positioning mark 101c, the third positioning mark 101d, and the fourth positioning mark 101e are four neighboring marks closest to the central positioning mark 101a in distance, and are respectively located at four corners of the central positioning mark 101a.

Figure 2:
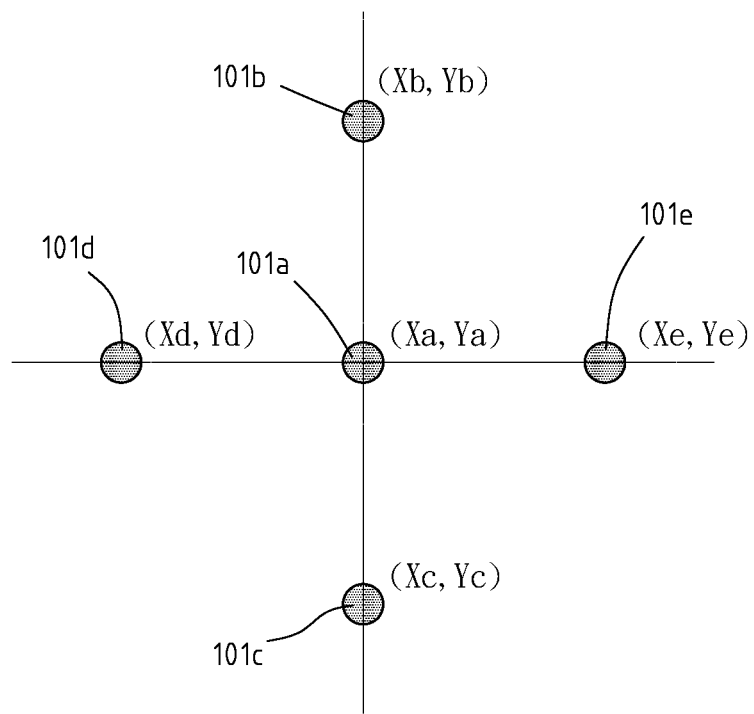
FIG. 2 is a distribution view that shows a cross-shaped positioning pattern in a code pattern according to the invention.

Referring to FIG. 2, in order to make the cross-shaped positioning pattern 12 easier to identify, a positional coordinate (Xa, Ya) of the central positioning mark 101a is put into a following correlative relationship (Formula 1) between positional coordinates of the first positioning mark 101b (Xb, Yb), the second positioning mark 101c (Xc, Yc), the third positioning mark 101d (Xd, Yd), and the fourth positioning mark 101e (Xe, Ye):

$$Xa=(Xb+Xc+Xd+Xe)/4$$

$$Ya=(Yb+Yc+Yd+Ye)/4$$

Figure 3:
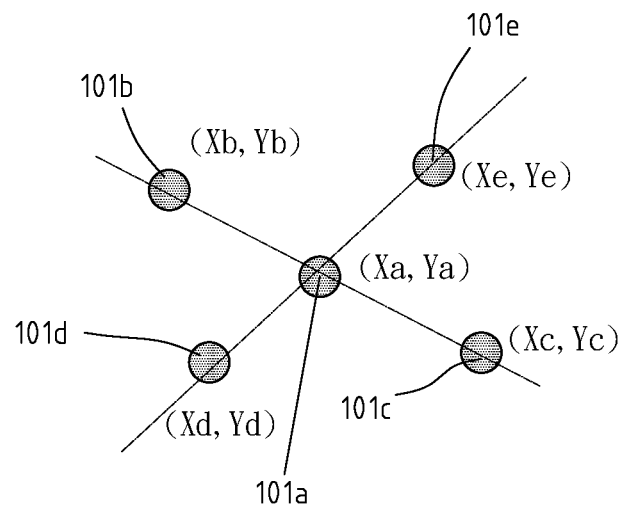
FIG. 3 is an example that shows a cross-shaped positioning pattern of a code pattern being tilted during image capture according to the invention.

Referring to FIG. 3, due to the fact that the cross-shaped pattern and correlative positional coordinates are used in the invention, whenever an image-taking equipment is utilized to take an image of the code pattern 10, the correlative relationship between the positional coordinates of the central positioning mark 101a, the first positioning mark 101b, the second positioning mark 101c, the third positioning mark 101d, and the fourth positioning mark 101e of the cross-shaped positioning pattern 12 will remain the same, regardless of whether the code pattern 10 has been rotated at any angles or tilted. Moreover, the distribution of the central positioning mark 101a, the first positioning mark 101b, the second positioning mark 101c, the third positioning mark 101d, and the fourth positioning mark 101e still remains very close to the shape of a cross.

Furthermore, in order to increase the rate of successful identification in regard to the cross-shaped positioning pattern 12 of the invention, a varied correlative relationship (Formula 2) between the positional coordinates can be employed in the invention, as shown below:

$$(Xb+Xc+Xd+Xe)/4 - \Box X \Box Xa \Box (Xb+Xc+Xd+Xe)/4 + \Box X$$

$$(Yb+Yc+Yd+Ye)/4 - \Box Y \Box Ya \Box (Yb+Yc+Yd+Ye)/4 + \Box Y$$

In which $\Box X$ is a predetermined tolerable error of the X-axis, and $\Box Y$ is a predetermined tolerable error of the Y-axis.

In other words, the central positioning mark can be easily identified, by finding out which of the marks has a coordinate that is one-fourths of a sum resulted from adding together coordinates of four surrounding marks thereof, whereas the four surrounding marks are the positioning marks. After knowing which is the central positioning mark and which are the positioning marks, the information represented by the other marks can be easily deduced.

Figure 4:
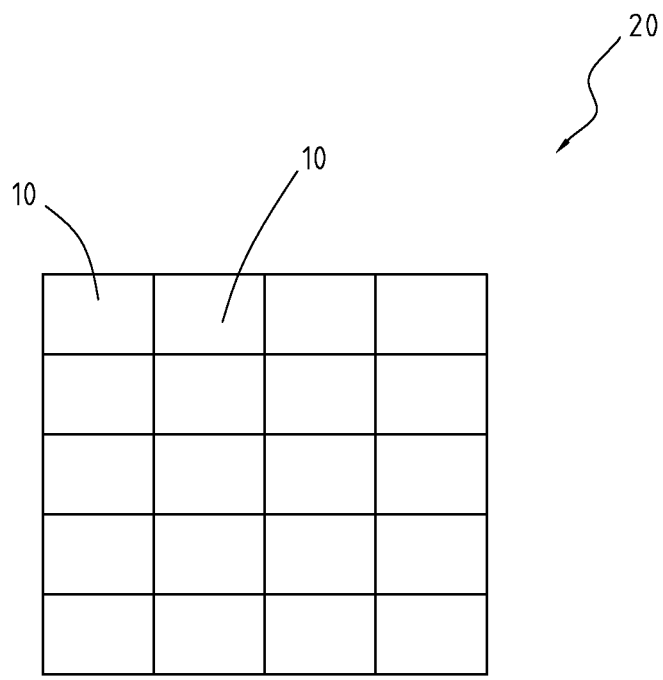
FIG. 4 is a schematic view that shows code patterns having cross-shaped positioning patterns according to the invention.

FIG. 4 is an example that shows code patterns 20 having cross-shaped positioning patterns 12 according to the invention, in which a plurality of code patterns 10 are aligned next to each other to form a group of code patterns 20. Each of the code patterns 10 includes a cross-shaped positioning pattern 12 disposed therein (not shown in FIG. 4).

Figure 5:
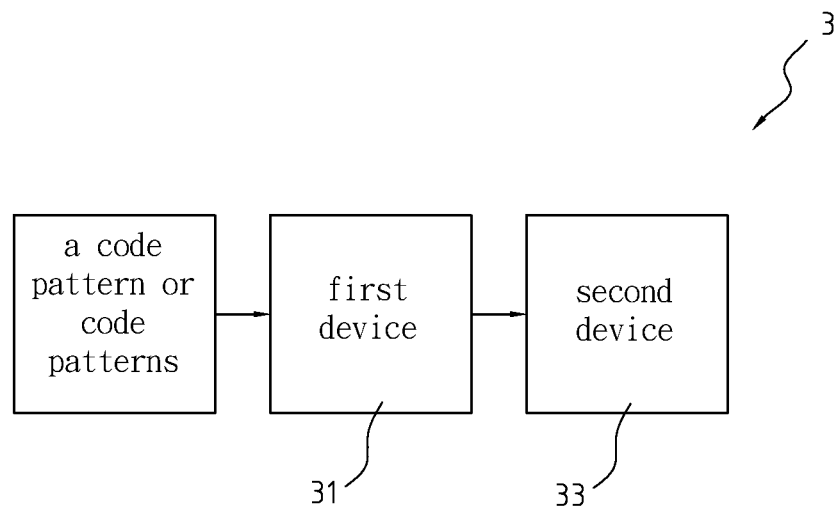
FIG. 5 is a schematic view of a framework that shows an image processing device for processing code patterns having cross-shaped positioning patterns according to the invention.

FIG. 5 is a schematic view of a framework that shows an image processing device for processing code patterns having cross-shaped positioning patterns according to the invention. An image processing device 3 is used for processing the code pattern 10 and the code patterns 20 having the cross-shaped positioning patterns, and for outputting indicative signals corresponding to the marks 101a, 101b, 101c, 101d, and 101e of the cross-shaped positioning pattern 12 from the code pattern 10. The image processing device 3 includes: a first device 31 and a second device 33, which are respectively described in the following paragraphs. The first device 31 is used for reading the code pattern 10 or the code patterns 20, and can be used for reading the code pattern 10 or the code patterns 20 in FIGS. 1 and 4 as an example, as well as for converting the optically read code pattern 10 or code patterns 20 into corresponding digital signals. The second device 33 is connected to the first device 31 and used for processing the digital signals, so as to determine which is the central positioning mark 101a, the first positioning mark 101b, the second positioning mark 101c, the third positioning mark 101d, and the fourth positioning mark 101e from the marks 101. The first device 31 can be, for example, a CCD imaging component or a CMOS sensor component.

Figure 6:
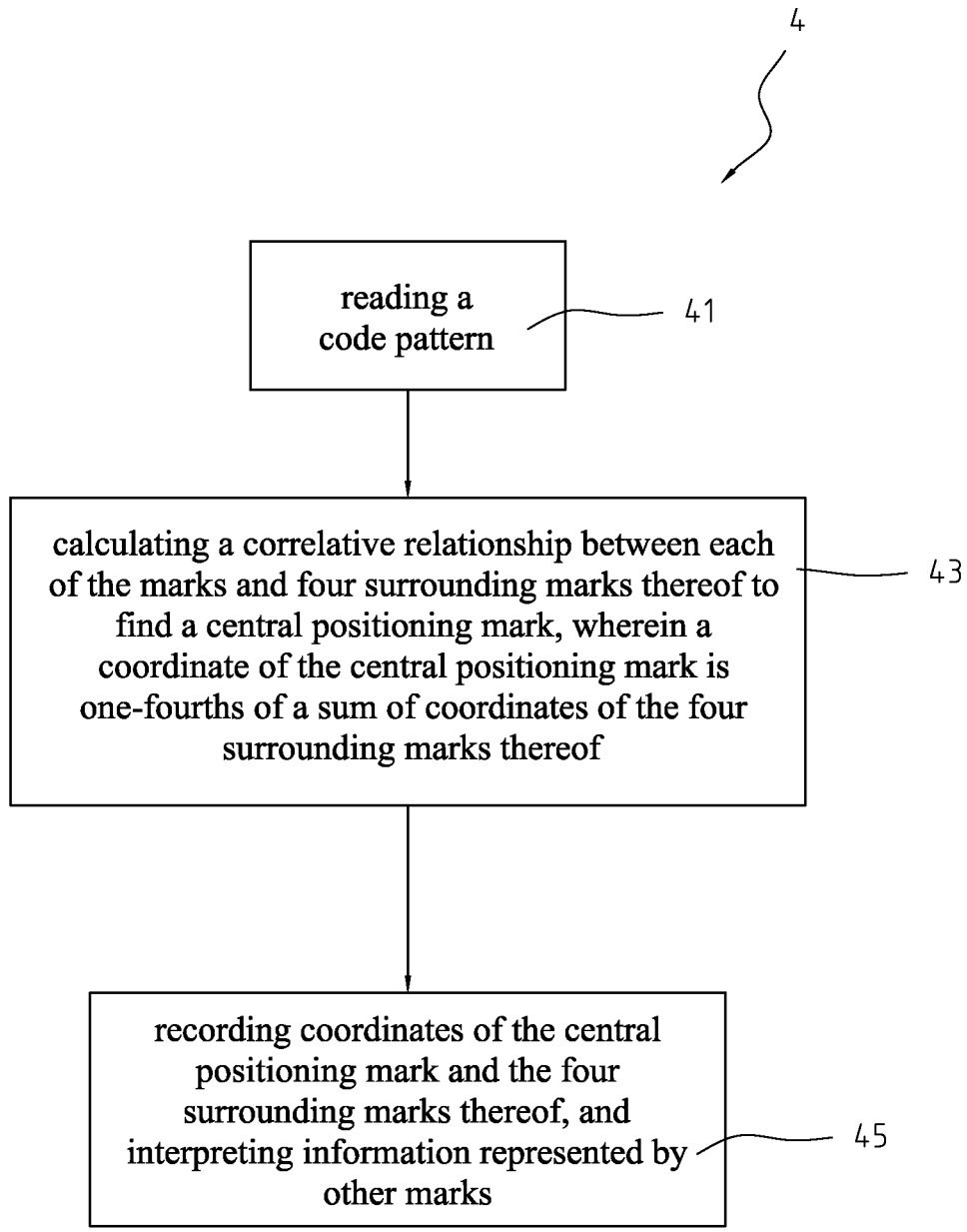
FIG. 6 is a flow chart that shows a method for processing code patterns having cross-shaped positioning patterns according to the invention.

FIG. 6 is a flow chart that shows a method for processing code patterns according to the invention. In the invention, a method 4 is used for locating the cross-shaped positioning pattern of the code pattern 10, and for recording coordinates of the central positioning mark 101a, the first positioning mark 101b, the second positioning mark 101c, the third positioning mark 101d, and the fourth positioning mark 101e of the cross-shaped positioning pattern 12. The method 4 comprises steps 41, 43, and 45, which are described below respectively. The step 41 is reading images corresponding to the code pattern 10. A plurality of code patterns 10 are disposed on surfaces of objects (for example, papers), and an image-capture device (for example, a scanner) with image-scanning functionality is used to capture images corresponding to the code pattern 10 on the surfaces of the objects.

In the present invention, the code pattern 10 has the cross-shaped positioning pattern 12, and because the cross-shaped positioning pattern is less susceptible to image tilting and rotating, the original cross-shaped positioning pattern is prevented from serious deforming. As a result, even if a captured image is tilted or rotated at an angle in the step 41, the method 4 would not require additional image alignment process for processing the tilted or rotated images, thus skipping the time-consuming image alignment process.

The step 43 is finding out which of the marks 101 are the central positioning mark 101a, the first positioning mark 101b, the second positioning mark 101c, the third positioning mark 101d, and the fourth positioning mark 101e from the images by utilizing the aforesaid Formulas 1 or 2. The step 45 is recording the coordinates of the central positioning mark 101a, the first positioning mark 101b, the second positioning mark 101c, the third positioning mark 101d, and the fourth positioning mark 101e, and interpreting information represented by the other marks 101.

In the step 43, the correlative relationship between a coordinate of one mark 101 and coordinates of four closest marks 101 thereof is continuously calculated, and if the aforesaid Formula 1 or 2 are satisfied, then the mark 101 is identified as the central positioning mark 101a, and the other four marks 101 at four closest corners thereof are respectively identified as the first positioning mark 101b, the second positioning mark 101c, the third positioning mark 101d, and the fourth positioning mark 101e.

Subsequently, the coordinates of the identified central positioning mark 101a, the first positioning mark 101b, the second positioning mark 101c, the third positioning mark 101d, and the fourth positioning mark 101e are recorded in the step 45, and the five identified marks 101a to 101e are the marks that make up the cross-shaped positioning pattern 12. By using the identified cross-shaped positioning pattern 12, the information represented by the other marks from the images can be deduced. For instance, directional marks can be further identified by using the cross-shaped positioning pattern 12, and the directional marks are the examples of the information that may be represented by the aforesaid other marks 101.

The calculation of coordinates in the aforesaid Formula 1 or 2 is carried out by dividing a sum by four, and can be substituted by dividing the sum by two twice. The calculation of dividing the sum by two is equivalent to the right-shift operation, which indicates the calculation required in the step 43 can be readily completed.

According to the present invention, the cross-shaped positioning pattern of the code pattern is readily identifiable, and can be easily differentiated from numerous other marks 101. Once the coordinate of the cross-shaped positioning pattern is known, the information of the other marks can be obtained by making use of their correlative relationship with the cross-shaped positioning pattern 12, which speeds up the interpretation of the code pattern as described in the invention.

The aforesaid are merely preferred embodiments of the present invention and should not be used to restrict the scope of the present invention, and it is understood that those skilled in the art may carry out changes and modifications to the described embodiments without departing from the content of the invention.

What is claimed is:
1. A code matrix, comprising:
multiple code patterns arranged adjacent to each other, each code pattern comprising:
a plurality of marks; and only one positioning pattern disposed within said plurality of marks, wherein said positioning pattern consists of five positioning marks which form a shape of a cross, said five positioning marks including a central positioning mark, a first positioning mark, a second positioning mark, a third positioning mark, and a fourth positioning mark, wherein a coordinate of said central positioning mark is equal to one-fourth of a sum of coordinates of said first positioning mark, said second positioning mark, said third positioning mark, and said fourth positioning mark; and wherein the five positioning marks of said positioning pattern form the only group of marks of the plurality of marks having the coordinate of the central positioning mark equal to one-fourth of a sum of coordinates of four respective nearest neighboring marks.

2. The code matrix of claim 1, wherein said first, said second, said third, and said fourth positioning marks are closer to said central positioning mark than said plurality of marks.

3. A code matrix, comprising:

multiple code patterns arranged adjacent to each other, each code pattern comprising:

a plurality of marks; and only one cross-shaped positioning pattern composed of five positioning marks, said five positioning marks including a central positioning mark, a first positioning mark, a second positioning mark, a third positioning mark, and a fourth positioning mark, wherein said central positioning mark, said first positioning mark, said second positioning mark, said third positioning mark, and said fourth positioning mark are distributed within a region along with other marks;

wherein said first positioning mark, said second positioning mark, said third positioning mark, and said fourth positioning mark are four neighboring marks being closest to said central positioning mark in distance;

wherein said central positioning mark, said first positioning mark, said second positioning mark, said third positioning mark, and said fourth positioning mark a positioning pattern having a shape of a cross;

wherein a coordinate of said central positioning mark is equal to one-fourth of a sum of coordinates of said first positioning mark, said second positioning mark, said third positioning mark, and said fourth positioning mark; and wherein the five positioning marks of said positioning pattern form the only group of marks of the plurality of marks having the coordinate of the central positioning mark equal to one-fourth of a sum of coordinates of four respective nearest neighboring marks.

4. The code matrix of claim 3, wherein said region is a region having a predetermined area.

5. An image processing device, comprising:

a first device for reading a code matrix composed of multiple code patterns arranged adjacent to each other, each code pattern having a plurality of marks; and a second device for calculating a correlative relationship between a positional coordinate of each of said marks and positional coordinates of four surrounding marks thereof, so as to find a central positioning mark and four positioning marks, wherein said central positioning mark is located centrally among said four positioning marks;

wherein said central positioning mark and said four positioning marks form a positioning pattern having a shape of a cross;

wherein a coordinate of said central positioning mark is equal to one-fourth of a sum of coordinates of said four positioning marks, and wherein said central positioning mark and said four positioning marks form the only group of marks of the plurality of marks having the coordinate of the central positioning mark, equal to one-fourth of a sum of coordinates of four respective nearest neighboring marks.

6. The image processing device of claim 5, wherein said first device is a CCD component or a CMOS sensor component.

7. A method for processing a code matrix comprising multiple code patterns arranged adjacent to each other, wherein each code pattern includes a plurality of marks, said method comprising:

reading said code pattern; and calculating a correlative relationship between a positional coordinate of each of said marks and positional coordinates of four positioning marks thereof to find a central positioning mark, wherein a coordinate of said central positioning mark is equal to one-fourth of a sum of coordinates of said four positioning marks thereof;

wherein said central positioning mark and said four positioning marks form a positioning pattern having a shape of a cross within said code pattern; and wherein said central positioning mark and said four positioning marks form the only group of marks of the plurality of marks having the coordinate of the central positioning mark equal to one-fourth of a sum of coordinates of four respective nearest neighboring marks.

8. The method of claim 7, further comprising a step of recording the coordinates of said central positioning mark and said four positioning marks thereof, and interpreting information represented by other marks.

\* \* \* \* \*